Patented May 26, 1936

2,042,023

UNITED STATES PATENT OFFICE 2,042,023

QUATERNARY HETEROCYCLIC UREA COMPOUNDS AND MANUFACTURE THEREOF

Fritz Schönhöfer and Hans Henecka, Wuppertal-Elberfeld, Germany, assignors to Winthrop Chemical Company Inc., New York, N. Y., a corporation of New York No Drawing. Application August 5, 1932, Serial No. 627,677. In Germany August 18, 1931

21 Claims. (Cl. 260—41)

This invention relates to new therapeutically active media and to a process of preparing the same.

In accordance with our invention new therapeutically active media which display a remarkable efficiency against blood parasites are obtainable by the synthesis of heterocyclic or aromatic-heterocyclic amino compounds a cyclically bound nitrogen atom of which is present in its quaternary form and the amino group of which is the member of a urea or thiourea grouping. Accordingly, the group of new therapeutically active compounds discovered by us and characterized by the above indicated groupings may be represented by the general formula:

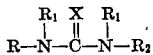

In this formula R stands for the heterocyclic or aromatic-heterocyclic nucleus containing nitrogen in quaternary heterocyclic linkage, the N attached to R is linked to a ring carbon atom of the radical R, $R_1$ stands for hydrogen or alkyl, $R_2$ stands for hydrogen or an organic radical, and X stands for O or S.

The heterocyclic or aromatic-heterocyclic nucleus containing nitrogen in quaternary heterocyclic linkage are represented by the symbol R in the above formula may be the radical of a mono-, bi- or tri-cyclic compound, such as the quaternary imidazole, piperidine, pyrazole, benzimidazole, pyridine, quinoline, isoquinoline, acridine and carbolidine radical. We prefer the use of the quaternary quinoline radical. Such quaternary quinoline radical may be represented by the general formula:

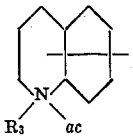

wherein $R_3$ stands for alkyl or aralkyl, for instance, methyl, ethyl, isopropyl, allyl, hydroxypropyl, oxopropyl, and benzyl, and $ac$ stands for an acid radical usual in quaternary nitrogen salts, such as the radical of sulfuric, monoalkylsulfonic, hydrohalic, for instance, hydrochloric, hydrobromic or hydroiodic acid, but also other acid radicals, such as the toluene sulfonic acid or the acetyl radical may be the acid salt forming component attached to the quaternary nitrogen atom. The quinoline nucleus may contain those substituents which are usual as ring substituents, such as alkyl, for instance, methyl, ethyl, isopropyl, allyl, isoamyl, and corresponding alkoxy groups, furthermore, phenyl, halogen, nitro, amino, ethylamino and the hydroxy group.

The substituent $R_1$ of the amino group is preferably hydrogen; however, the hydrogen may be replaced by alkyl groups, such as the methyl, ethyl, propyl, isopropyl, allyl, crotyl or isoamyl groups, without remarkable change of the general character, particularly of the therapeutic activity of our new products.

The organic radical represented by the symbol $R_2$ in the above formula may be varied in a high degree. Instead of hydrogen $R_2$ may be, for example, an alkyl group of the kind above stated or a cyclo-alkyl group, or it may be an aralkyl group, such as the benzyl group, or an aryl group, such as phenyl, and substituted phenyl, for instance, alkyl-, alkoxy- or phenoxy-, aminoalkyl-, aminoalkoxy-, halogen-hydroxy-, nitro-, amino-, alkylamino-, and aminoalkylamino-phenyl radicals or analogous naphthyl radicals. We prefer to use in our new compounds as radicals representing $R_2$ heterocyclic radicals, such as pyridyl, piperidyl, pyrazolyl, and especially a quinolyl or isoquinolyl radical. The cyclically bound nitrogen atom of such a heterocyclic radical may be present in its trivalent or its quaternary form. The heterocyclic radical may be substituted in a similar way as indicated above for the phenyl radical. A cyclic radical representing $R_2$ may be linked to the N atom attached to $R_2$ in the above formula directly by a ring carbon atom or by means of other groups usual for connecting amino groups with a cyclic ring system, such as alkylene groups, the —CO— group, the —NH—CO— group and the like. A more detailed disclosure of the various radicals which may represent $R_2$ will be found in the numerous products prepared in accordance with the present invention and hereafter described in the examples.

It results that many variations within the new group of therapeutically active compounds defined by the above formula may be made, provided that always those groupings which characterize the said new class of therapeutically active compounds and which we consider to be responsible for their therapeutic action on blood parasites are present, namely, a heterocyclic radical containing cyclically bound quaternary nitrogen, to a ring carbon atom of which heterocyclic radical a urea grouping is attached which may be substituted by substituents of very different character. Equivalent to the urea grouping is the thiourea grouping. Within the group of compounds defined above the compounds of the general formula:

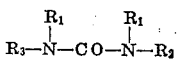

wherein $R_3$ stands for a quaternary quinoline nucleus and wherein $R_1$ and $R_2$ have the above indicated meaning, have proved especially useful in practice.

It may be mentioned that the cyclically bound quaternary nitrogen atom and the urea- or thio-urea-like grouping may be present in our new compounds more than once. Substituents may be introduced into our new compounds also subsequently, for example, by the known methods of nitration, alkylation or acylation. Substituents, such as alkyl, alkoxy, phenyl, nitro, amino, acylamino, halogen and hydroxy groups do not change the essential therapeutic activity of our new products. Accordingly, this invention is intended to include also compounds containing such substituents. It may be mentioned that often those compounds wherein both nitrogen atoms of the urea grouping are substituted by a quaternary heterocyclic nucleus, for example, a heterocyclic quinoline nucleus, are distinguished by their especially high therapeutic activity.

Our new compounds are in general white to yellowish colored crystallized compounds, soluble in water and mono- and polyvalent liquid alcohols, slightly soluble in benzene, nitrobenzene, ether and chloroform.

In accordance with our invention the above described new products are obtained by reacting upon a compound of the general formula:

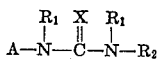

with an alkylating agent while heating. In this formula A stands for a heterocyclic or aromatic-heterocyclic ring system containing at least one cyclically bound trivalent nitrogen atom, the N attached to A is linked to a ring carbon atom of the ring system representing A, $R_1$, $R_2$ and X represent the same groups as indicated above for these symbols, namely $R_1$ stands for hydrogen or alkyl, $R_2$ stands for hydrogen or an organic radical and X stands for O or S.

As alkylating agents have proved operable in our new process those compounds normally used as alkylating agents in the art, that is, alkyl- and aralkyl-halides, such as methyl iodide or bromide, ethyl, propyl or isopropyl iodide, allyl or benzyl chloride or bromide, or the corresponding aryl-sulfonates. We prefer the use of dialkyl- or di-aralkyl-sulfates, such as dimethyl-, diethyl-, di-(beta-oxopropyl)-, diallyl-, dicrotyl-, diisoamyl-, dicyclopentyl-, dicyclohexyl- and dibenzyl-sulfates as the alkylating agent. All the alkylating agents are intended to be included when using the term "alkylating agent" in the appended claims. The alkylating process is carried out while heating the reacting components preferably in the presence of an indifferent organic solvent, such as benzene, chlorobenzene, nitrobenzene and tetrahydronaphthalene to a temperature ranging from about 80° to about 200° C. Generally a temperature of about 120° C. will be sufficiently high for the alkylating process. In general we prefer the use of dialkyl-sulfates as alkylating agent even in those cases in which a quaternary halide is finally desired. In such cases the quaternary alkysulfate salts primarily formed are subsequently converted into the corresponding halide salts, for example, by precipitating the quaternary halide salt from the aqueous solution of the corresponding alkylsulfate salt by the addition of a concentrated alkali halide solution, or of a alcoholic hydrogen halide.

Our new compounds are likewise obtainable by starting with a heterocyclic compound containing a quaternary bound nitrogen atom and attached to a ring carbon atom, a primary or secondary amino group. The said primary or secondary amino group may be combined with a

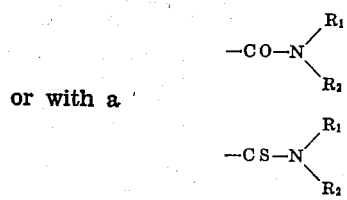

group (the symbols $R_1$ and $R_2$ have the above mentioned meaning) by first reacting upon the said starting material with a carbonylhalide or thiocarbonylhalide and substituting the halogen atom of the carbamic acid halide compound formed by the ammonia or a substituted ammonia radical. Urea or thiourea compounds of the above defined constitution are likewise obtainable by reacting upon the above mentioned quaternary heterocyclic compounds containing a primary or secondary amino group attached to a ring carbon atom with an iso- or thiocyanate in the manner known in the art. Vice versa, the urea or thiourea compounds may be obtained by reacting upon an iso- or thiocyanate of a heterocyclic or aromatic-heterocyclic base containing a cyclically bound quaternary nitrogen atom, with ammonia or substituted ammonia.

Our invention is further illustrated by the following examples, but is not limited to the specific processes and compounds described therein:

*Example 1*

Carbonylchloride is introduced into a solution of 14.4 grams of 6-aminoquinoline in 200 ccs. of 10% acetic acid at normal or slightly raised temperature (40° to 60° C.) after the addition of 100 ccs. of 50% aqueous sodium acetate solution. The N,N'-diquinolyl-6-urea separates from the solution to a great deal. For purifying it is transformed into its di-hydrochloride and then reconverted into the urea base of the melting point of 260° to 262° C.

One mol. of the urea compound is heated with 2 mols of dimethylsulfate in the presence of nitrobenzene or chlorobenzene at about 80° C. for one hour while stirring. A bis-quaternary compound of the probable formula:

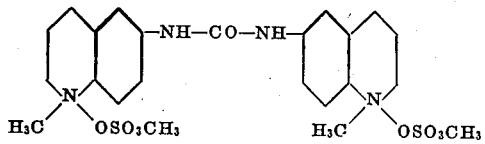

having the melting point of 235° to 237° C. (while decomposing) is obtained.

The above methylsulfate compound which is readily soluble in water is converted into the corresponding methylquinoliniumchloride compound by dissolving it in a small quantity of water, adding alcoholic hydrogenchloride and causing precipitation of the chloride formed by means of ether or petroleum ether. After recrystallizing from alcohol the bis-chloromethylate of the N,N'-diquinolyl-6-urea thus obtained is a yellowish crystalline powder of the melting point of 260° C. It is readily soluble in water. The corresponding bis-iodomethylate is obtainable from the aqueous solution of the methylsulfate compound by precipitation by means of sodium iodide solution. It is a yellow, water-soluble crystalline powder of the melting point of 255° to 257° C.

In a corresponding manner there is produced from 5-aminoquinoline by the action of carbonylchloride the N,N'-diquinolyl-5-urea, which melts at 284° to 285° C. and the quaternary salt of which, obtained by the action of dimethylsulfate, melts at 217° C. (while decomposing). The corresponding urea from the 7-aminoquinoline melts at 282° C., its quaternary salt at 228° C. (while decomposing), and the urea from 3-aminoquinaldine has a melting point of 276° C., while its quaternary salt melts at 193° C. (while decomposing).

By nitrating the quaternary salt obtained from N,N'-diquinolyl-6-urea in accordance with the customary methods and precipitating the resulting solution by means of sodium chloride or hydrochloric acid the bis-chloromethylate of N,N'-di-5-nitroquinolyl-6-urea is obtained. (Melting point 242° C., while decomposing.)

When only one molecular proportion of dimethylsulfate is caused to act on one molecular proportion of the N,N'-diquinolyl-6-urea in the presence of nitrobenzene, the N-(quinolyl-6-)-N'-(methylquinolinium-methylsulfate-6)-urea of the probable formula:

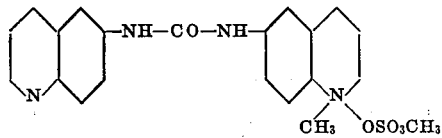

is produced, which melts at 168° C. This salt in contradistinction to the salt obtained by the action of two molecular proportions of dimethylsulfate, can be precipitated in the form of the chloromethylate from aqueous solution by means of sodium chloride solution.

Analogous substances displaying similar solubility properties are obtained by starting from the 6-methyl-aminoquinoline.

The bis-methylsulfate of the N,N'-di-6-methoxyquinolyl-5-urea, obtained in an analogous manner to that described above from 5-amino-6-methoxyquinoline melts at 192° C. (while decomposing). It is likewise yellow colored and readily soluble in water.

When starting from 6-amino-8-methoxyquinoline there is obtained in an analogous manner as described above the bis-methylsulfate of the N,N'-di-8-methoxyquinolyl-6-urea, melting at 194° C. (while decomposing).

The bis-methylsulfate of the symmetrical urea of 3-amino-carbolidine (see U. S. application for Letters Patent Serial No. 546,909, Example 11), melting point 276° to 277° C., obtained in an analogous manner to that described above from 3-aminocarbolidine is a crystalline power of the probable formula:

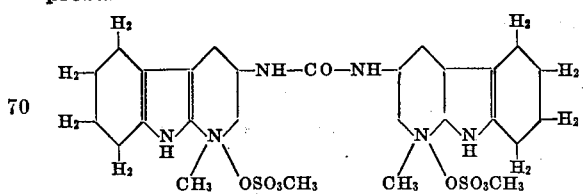

which is readily soluble in water. (Melting point 211° C. while decomposing.)

Example 2

20 grams of 6-amino-8-methylquinoline are dissolved in 200 ccs. of acetone, 20 grams of potassium carbonate are added and then 10 grams of thiocarbonylchloride. The N,N'-di-8-methylquinolyl-6-thiourea, which thus precipitates melts at 196° C. after being dissolved in dilute hydrochloric acid and precipitated by means of ammonia.

The same thiourea is produced by prolonged boiling of an alcoholic solution of 6-amino-8-methylquinoline with carbon bisulfide. The methylsulfate obtained from this thiourea as described in Example 1 is a hygroscopic crystalline powder; the bis-chloromethylate derived therefrom by means of alcoholic hydrogenchloride is a likewise hygroscopic, light yellow crystalline powder, which melts while decomposing at about 100° to 105° C.

In a corresponding manner the N,N'-diquinolyl-6-thiourea (melting point 199° C.) is produced from 6-aminoquinoline by the action of thiocarbonylchloride or carbon bisulfide, the bis-chloromethylate of which, obtained according to the directions of Example 1, melts at 237° C. while decomposing. In a like manner the thiourea is produced from 7-amino-quinoline (melting point 179° to 180° C. while decomposing); its methylsulfate decomposes at 160° C., from 5-amino-quinoline the thiourea, melting at 178° C., the hygroscopic bis-chloromethylate thereof melts at about 150° C., and from 3-amino-quinaldine the thiourea, melting at 208° C., the bis-chloromethylate of which melts at 205° to 206° C. while decomposing.

Example 3

By the action of equimolecular quantities of 6-amino-quinoline hydrochloride and potassium thiocyanate in aqueous solution the 6-quinolyl-thiourea is produced which melts at 218° C. The quaternary salt which is obtained by the action of equimolecular quantities of dimethylsulfate on the said thiourea in the presence of nitrobenzene at water bath temperature is likewise readily soluble in water and melts at 208-209° C., after crystallization from dilute alcohol.

Besides precipitating the solution of the methylsulfate by means of salt or alcoholic hydrogenchloride the corresponding methylquinolinium chloride is likewise obtained by the action of equimolecular quantities of the hydrochloride of 6-amino-methylquinoliniumchloride and potassium thiocyanate in aqueous solution. It forms a light yellow salt, readily soluble in water, melting at 234° C.

By the action of equimolecular quantities of the hydrochloride of 6-amino-methylquinoliniumchloride and sodium cyanate in aqueous solution there is obtained in an analogous manner the chloromethylate of the quinolyl-6-urea of the probable formula:

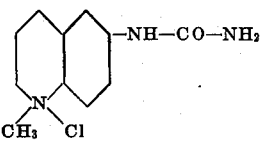

It forms after crystallization from dilute alcohol yellow crystals, readily soluble in water, melting at 240° C. while decomposing.

Example 4

Equimolecular quantities of gamma-aminopyridine and phenol carbonate are heated to 180° to 200° C. in a fractionation flask and after the bulk of phenol has been distilled off are heated in the vacuum of a water-pump to remove the phenol completely. The di-gamma-pyridylurea thus obtained forms after crystallization from alcohol a colorless crystalline powder, melting at 208° C. The quaternary salt obtained therefrom in an analogous manner to Example 1 by the action of two mols of dimethyl-sulfate on one mol. of the urea is a colorless compound, readily soluble in water and melting at 191° C. while decomposing.

When nitric acid of a specific gravity of 1.5 is caused to act on this compound in the presence of concentrated sulfuric acid, a nitro compound of the bis-chloromethylate of di-gamma-pyridyl-urea of the probable formula:

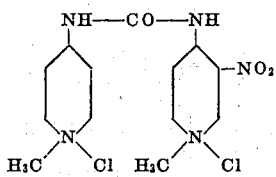

is obtained after neutralization and precipitation by means of salt, which forms a light yellow powder, readily soluble in water.

Example 5

5 grams of quinoline-6-carbonazide of the melting point 88° C. are dissolved in 100 ccs. of hot benzene, free from water, 4.35 grams of 6-methoxy-8-amino-quinoline in 100 ccs. of benzene, free from water, are added and heating to boiling proceeds for some 6 hours. The resulting N-(quinolyl-6)-N'-(6-methoxyquinolyl-8)-urea, melting at 229° C., separates quantitatively. By acting on this urea with 1 molecular proportion of dimethylsulfate according to the directions of Example 1 the N-(methyl-quinoliniummethyl-sulfate-6)-N'-(6-methoxyquinolyl-8)-urea is obtained (which melts at 239° C. while decomposing and is readily soluble in water.

By the action of equivalent quantities of other amino compounds on quinoline-6-carbon azide corresponding unsymmetrical ureas are produced in a like manner, which, as described in Example 1 can be converted by the action of dimethylsulfate into readily soluble quaternary salts; for example, 1-phenyl 2,3-dimethyl-4-amino-5-pyrazolone yields the unsymmetrical N-(quinolyl-6)-N-(1-phenyl-2,3-dimethyl-5-oxo-pyrazolyl-4)-urea, melting at 242° to 243° C. When acting with two molecular proportions of dimethylsulfate on one molecular proportion of this urea, a light yellow salt of the probable formula:

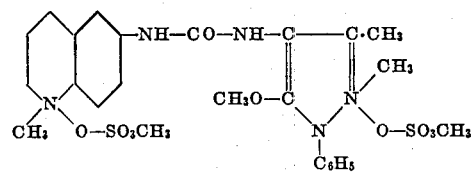

melting at 217° C. while decomposing is obtained, which is readily soluble in water.

N-methyl-1,2,3,4-tetrahydro-6-amino-quinoline yields the unsymmetrical N-(quinolyl-6)-N'-(1-methyl-1,2,3,4-tetrahydroquinolyl-6)-urea, melting at 227° C.; the quaternary salt obtained therefrom by the action of two molecular proportions of dimethyl sulfate forms readily soluble almost colorless crystals which melt at 206°–207° C. while decomposing. The 6-(meta-amino-para-toluylamino)-quinoline, when reacted upon with quinoline-6-carbonazide yields the N-(quinolyl-6)-N'-(6-quinolylamino-para-toluyl-meta)-urea which melts at 245° C. By means of two molecular proportions of dimethylsulfate a quaternary salt of the probable formula:

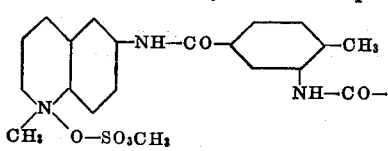 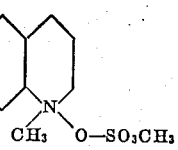

is obtained therefrom in the form of light yellow fine crystals which melt at 224° C. while decomposing.

3-diethylamino-ethoxy-aniline yields the N-(quinolyl-6)-N'-(3-diethylamino-ethoxy-phenyl-1)-urea, melting at 193° C. The action of two molecular proportions of dimethylsulfate converts the same into the quaternary salt which is a readily water-soluble sirup.

Equimolecular quantities of quinoline-6-carbonazide and methyl-diethylaminoethyl-amine yield in an analogous manner as described above the N-(quinolyl-6)-N'-methyl-N'-diethylamino-ethyl-urea in the form of a viscous sirup. When acting with two molecular proportions of dimethylsulfate on one molecular proportion of this urea, a readily water-soluble dark yellow sirup is obtained of the probable formula:

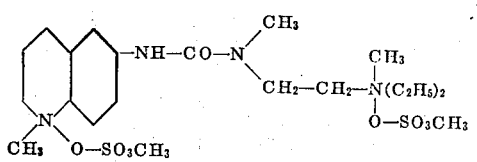

6-(para-aminophenoxy)-quinoline, when reacted upon with quinoline-6-carbonazide yields the N-(quinolyl-6)-N'-[para-(6-quinolyloxy)-phenyl]-urea, melting at 209° C.; by the action of two molecular proportions of dimethylsulfate a readily water-soluble yellow salt is obtained therefrom which melts at 242° C. while decomposing. The corresponding bismethylsulfate, derived from the N-(quinolyl-6)-N'-[para-(7-quinolyloxy)-phenyl]-urea is also a readily water-soluble yellow salt which melts at 88° to 90° C. after crystallization from methyl alcohol and ether.

By the action of two molecular proportions of quinoline-6-carbonazide on one molecular proportion of 1,2,3,4-tetrahydro-6-aminoquinoline there is obtained the N-(quinolyl-6)-N'-[1-(N-quinolyl-6-carbamino)-1,2,3,4-tetrahydroquinolyl-6]-urea, which forms a difficultly soluble hydrochloride; ammonia causes the separation therefrom of fine snow-white crystals containing one molecule of water, which begin to sinter at 90° C. and melt at 160° C. By the action of two molecular proportions of dimethylsulfate on this urea there is obtained a readily water-soluble yellow crystalline mass of the probable formula:

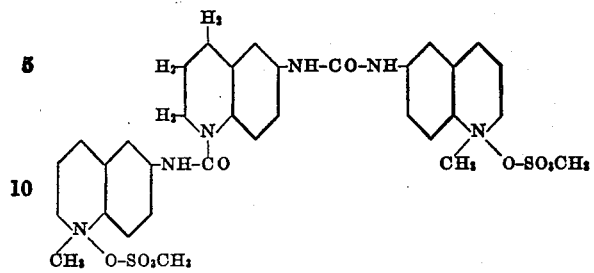

melting at 187° C. while decomposing.

By the action of one molecular proportion of quinoline-6-carbonazide on one molecular proportion of 4-amino-3',5'-dimethyldiphenyl-ether there is obtained the N-(quinolyl-6)-N'-(3',5'-dimethyldiphenyl-ether-4)-urea, melting at 198° C. By the action of dimethylsulfate on this a salt is produced in the form of yellow needles melting at 234° C.

In a similar manner there is obtained from quinoline-6-carbonazide and 5-aminoisoquinoline the N-(quinolyl-6)-N'-(isoquinolyl-5)-urea; the salt produced by the action of two molecular proportions of dimethylsulfate on this urea melts at 221–222° C. while decomposing.

From quinoline-6-carbonazide and 7-aminoquinoline there is obtained the N-(quinolyl-6)-N'-(quinolyl-7)-urea melting at 229° C.; the quaternary salt produced therefrom melts at 238° C. while decomposing. From quinoline-6-carbonazide and 5-chloro-8-aminoisoquinoline there is produced the N-(quinolyl-6)-N'-(5-chloroisoquinolyl-8)-urea melting at 234° C., the corresponding methylsulfate of which melts at 227° C. while decomposing.

From quinoline-7-carbonazide (melting point 109°–110° C. while decomposing) and 1-para-ethoxyphenyl-5-aminobenzimidazole there is obtained in an analogous manner as described above the unsymmetrical N-(quinolyl-7)-N'-(1-para-ethoxy-phenylbenzimidazolyl-5)-urea melting at 248° C., the corresponding methylsulfate of which of the probable formula:

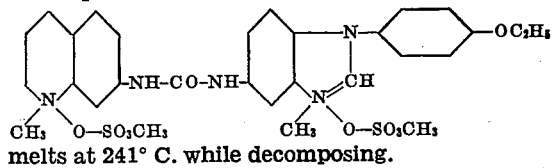

melts at 241° C. while decomposing.

From quinaldine-6-carbonazide (melting point 108° C. while decomposing) and piperidine, there is obtained the N-(quinaldyl-6)-N'-piperidylurea, melting at 160° C. By the action of one molecular proportion of dimethylsulfate on one molecular proportion of this urea, there is obtained a readily water-soluble quaternary salt, which melts at 181° C.

Example 6

33.5 grams of meta-nitro-para-toluic acid azide of the melting point 45°–47° C. and 32 grams of 6-aminoquinoline are dissolved in 400 ccs. of benzene free from water. This solution is boiled for some 6 hours. The resulting N-(quinolyl-6)-N'-(meta-nitro-para-tolyl)-urea separates almost quantitatively in the form of fine yellow crystals which melt at 250°–252° C.

The quaternary methylsulfate produced therefrom by the action of one molecular proportion of dimethylsulfate according to the directions of Example 1, forms yellow water-soluble crystals melting at 226° C.

Reduction of this salt by means of iron and dilute acetic acid in the manner known in the art, precipitating the resulting solution by means of sodium chloride solution and reprecipitating by means of alcoholic hydrogen chloride yield the hydrochloride of the N-(methylquinolinium-methylsulfate-6)-N'-(meta-amino-para-tolyl)-urea, melting at 268°–270° C. while decomposing.

In a corresponding manner as described above there is obtained by the action of equimolecular quantities of para-dimethylaminobenzoylazide and 6-aminoquinoline the N-(quinolyl-6)-N'-(para-dimethyl-aminophenyl)-urea, melting at 220° C. By acting with two molecular proportions of dimethylsulfate on this urea, according to the directions of Example 1, dissolving the resulting salt in a little water and precipitating by means of sodium chloride solution the N-(methyl-quinoliniumchloride-6)-N'-(4-trimethyl-phenylammoniumchloride-1)-urea results, which melts at 190° C. and forms almost white fine needles which are readily soluble in water.

Example 7

A solution of 13.7 grams of methylquinolinium-chloride-6-carbohydrazide-hydrochloride (melting point 235° C. while decomposing) in 100 ccs. of water is treated with a solution of 3.5 grams of sodium nitrite in 10 ccs. of water at a temperature of 0° C. The resulting solution of the corresponding carbonazide is boiled until nitrogen is no longer evolved and after cooling sodium iodide is added, when the bis-iodomethylate of the N-N'-diquinolyl-6-urea described in Example 1 precipitates in the form of a yellow crystalline powder according to the following probable equations:

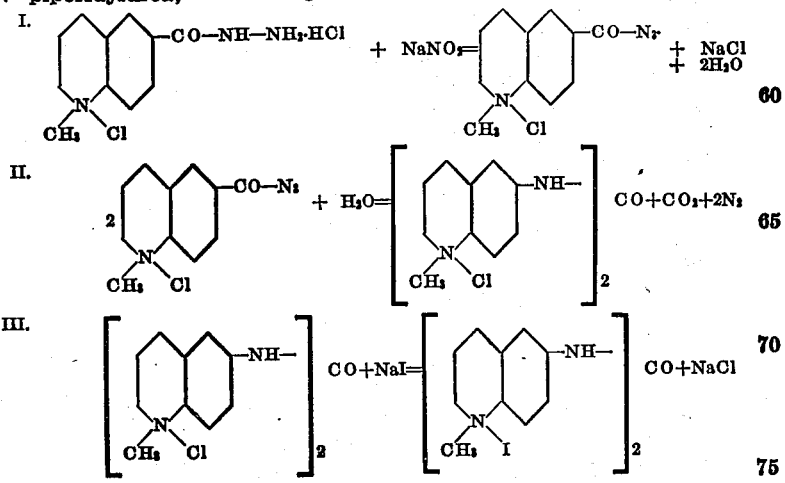

Example 8

10 grams of the hydrochloride of 6-biguanyl-methylquinolinium-chloride, melting at 245° C. and obtained by reacting with dicyandiamide upon the hydrochloride of 6-amino-methylquinoliniumchloride are introduced into 30 ccs. of concentrated sulfuric acid at room temperature. The solution thus obtained is poured on to about 30 grams of ice after short standing. It is then treated with 250 ccs. of alcoholic hydrogen chloride with sufficient cooling and 200 ccs. of ether are added when the 6-guanylcarbamino-methylquinoliniumchloride sulfate, melting at 150°–152° C. is precipitated in the form of a snow-white crystalline powder according to the following equation:

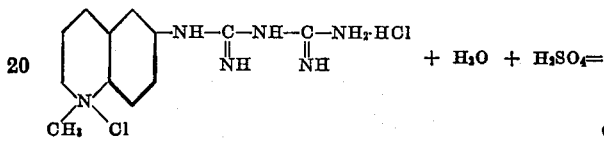

Example 9

5 grams of quinoline-6-carbonazide are dissolved in 100 ccs. of nitrobenzene and after the addition of a hot solution of 4.7 grams of quinoline-6-carbohydrazide (melting point 188° C.) in 100 ccs. of nitrobenzene, heated for 6 hours to 90–100° C. The 6-quinolinecarbonyl-6'-quinolyl-semicarbazide precipitates. It melts at 230° C. By reacting with two molecular proportions of dimethylsulfate upon one molecular proportion of this semicarbazide a readily soluble salt is obtained which by dissolving in dilute ethyl alcohol and precipitating with alcoholic hydrogen chloride is converted into the corresponding bischloromethylate of the probable formula:

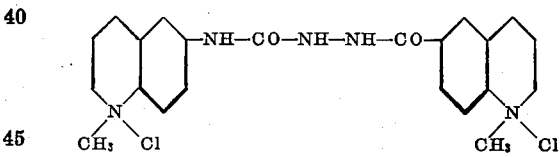

which melts at 252° C. while decomposing.

While we have described our invention in great detail and with respect to preferred forms and embodiments thereof, we do not desire to be limited to such details, forms and embodiments, since it becomes obvious from the above disclosure for those skilled in the art that many changes and modifications may be made and the invention embodied in other forms without departing from the spirit and scope thereof in its broader aspects. We, therefore, desire to cover all forms and modifications of any one or more of the appended claims. Particularly we emphasize that in the appended claims the term "heterocyclic nucleus" is used as including simple heterocyclic nuclei as well as aromatic-heterocyclic ring systems.

We claim:—

1. The process which comprises reacting upon a compound of the general formula:

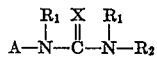

wherein A stands for a heterocyclic ring system containing only trivalent nitrogen as a hetero member, the N attached to A is linked to a ring carbon atom of the radical A, $R_1$ stands for hydrogen or alkyl, $R_2$ stands for hydrogen, alkyl, aralkyl of the benzyl series, aryl of the benzene and naphthalene series, or a heterocyclic radical containing only nitrogen as a hetero atom, and X stands for O or S, with an alkylating agent, while heating.

2. The process which comprises reacting upon a compound of the general formula:

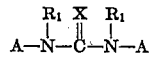

wherein A stands for a heterocyclic ring system containing only trivalent nitrogen as a hetero member, the N attached to A is linked to a ring carbon atom of the radical A, $R_1$ stands for hydrogen or alkyl, and X stands for O or S, with an alkylating agent, while heating.

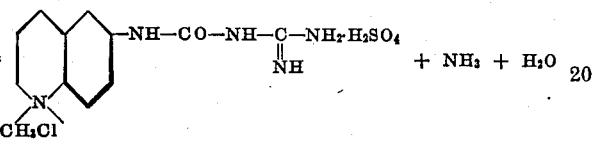

3. The process which comprises reacting upon a compound of the general formula:

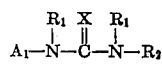

wherein $A_1$ stands for a tertiary quinoline radical, the N attached to $A_1$ is linked to a ring carbon atom of the said quinoline radical $A_1$, $R_1$ stands for hydrogen or alkyl, $R_2$ stands for hydrogen, alkyl, aralkyl of the benzyl series, aryl of the benzene and naphthalene series, or a heterocyclic radical containing only nitrogen as a hetero atom, and X stands for O or S, with an alkylating agent while heating.

4. The process which comprises reacting upon a compound of the general formula:

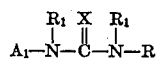

wherein $A_1$ stands for a tertiary quinoline radical, the N attached to $A_1$ is linked to a ring carbon atom of the said quinoline radical $A_1$, R stands for a heterocyclic radical containing only trivalent nitrogen as a hetero member, $R_1$ stands for hydrogen or alkyl, and X stands for O or S, with an alkylating agent, while heating.

5. The process which comprises reacting upon a compound of the general formula:

$$A_1—NH—CO—NH—R_2$$

wherein $A_1$ stands for a tertiary quinoline radical, the N attached to $A_1$ is linked to a ring carbon atom of the said quinoline radical $A_1$, and $R_2$ stands for hydrogen, alkyl, aralkyl of the benzyl series, aryl of the benzene and naphthalene series, or a heterocyclic radical containing only nitrogen as a hetero atom, with an alkylating agent, while heating.

6. The process which comprises reacting upon a compound of the general formula:

$$A_1—NH—CO—NH—R_5$$

wherein $A_1$ stands for a tertiary quinoline radical, $R_5$ stands for a quinoline radical, and the N atoms attached to $A_1$ and $R_5$ are linked to a ring carbon atom of the quinoline radicals representing $A_1$ and $R_5$, with an alkylating agent, while heating.

7. The process which comprises reacting upon a compound of the general formula:

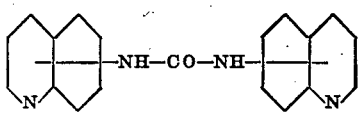

with an alkylating agent, while heating.

8. The compounds of the general formula:

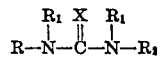

wherein R stands for a heterocyclic radical containing only nitrogen as a hetero member at least one of which is in its quaternary state, the N attached to R is linked to a ring carbon atom of the radical R, $R_1$ stands for hydrogen or alkyl, $R_2$ stands for hydrogen, alkyl, aralkyl of the benzyl series, aryl of the benzene and naphthalene series, or a heterocyclic radical containing only nitrogen as a hetero atom, and X stands for O or S, which compounds are whitish to yellowish crystalline products, soluble in water and mono- or polyvalent liquid alcohols, slightly soluble in benzene, nitrobenzene, ether or chloroform, and are characterized by a therapeutic action on blood parasites.

9. The compounds of the general formula:

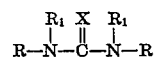

wherein R stands for a heterocyclic radical containing only nitrogen as a hetero member at least one of which is in its quaternary state, the N attached to R is linked to a ring carbon atom of the radical R, $R_1$ stands for hydrogen or alkyl, and X stands for O or S, which compounds are whitish to yellowish crystalline products, soluable in water and mono- or polyvalent liquid alcohols, slightly soluble in benzene, nitrobenzene, ether or chloroform, and are characterized by a therapeutic action on blood parasites.

10. The compounds of the general formula:

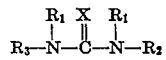

wherein $R_1$ stands for hydrogen or alkyl, $R_2$ stands for hydrogen alkyl, aralkyl of the benzyl series, aryl of the benzene and naphthalene series, or a heterocyclic radical containing only nitrogen as a hetero atom, $R_3$ stands for a quaternary quinoline ring system, the N attached to $R_3$ is linked to a ring carbon atom of the said quinoline ring system, and X stands for O or S, which compounds are whitish to yellowish crystalline products, soluble in water and mono- or polyvalent liquid alcohols, slightly soluble in benzene, nitrobenzene, ether or chloroform, and are characterized by a therapeutic action on blood parasites.

11. The compounds of the general formula:

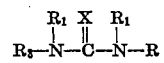

wherein R stands for a heterocyclic radical containing only nitrogen as a hetero member at least one of which is in its quaternary state, $R_1$ stands for hydrogen or alkyl, $R_3$ stands for a quaternary quinoline ring system, the N attached to $R_3$ is linked to a ring carbon atom of the said quinoline ring system, and X stands for O or S, which compounds are whitish to yellowish crystalline products, soluble in water and mono- or polyvalent liquid alcohols, slightly soluble in benzene, nitrobenzene, ether or chloroform, and are characterized by a therapeutic action on blood parasites.

12. The compounds of the general formula:

$$R_3\text{—NH—CO—NH—}R_2$$

wherein $R_2$ stands for hydrogen alkyl, aralkyl of the benzyl series, aryl of the benzene and naphthalene series, or a heterocyclic radical containing only nitrogen as a hetero atom, $R_3$ stands for a quaternary quinoline ring system, and the N attached to $R_3$ is linked to a ring carbon atom of the said quinoline ring system, which compounds are whitish to yellowish crystalline products, soluble in water and mono- or polyvalent liquid alcohols, slightly soluble in benzene, nitrobenzene, ether or chloroform, and are characterized by a therapeutic action on blood parasites.

13. The compounds of the general formula:

$$R_3\text{—NH—CO—NH—}R_5$$

wherein $R_3$ stands for a quaternary quinoline ring system, the N attached to $R_3$ is linked to a ring carbon atom of the said quinoline ring system, and $R_5$ stands for a quinoline radical, which compounds are whitish to yellowish crystalline products, soluble in water and mono- or polyvalent liquid alcohols, slightly soluble in benzene, nitrobenzene, ether or chloroform, and are characterized by a therapeutic action on blood parasites.

14. The compounds of the general formula:

$$R_3\text{—NH—CO—NH—}R_3$$

wherein $R_3$ stands for a quaternary quinoline ring system, the N attached to $R_3$ is linked to a ring carbon atom of the said quinoline ring system, which compounds are whitish to yellowish crystalline products, soluble in water and mono- or polyvalent liquid alcohols, slightly soluble in benzene, nitrobenzene, ether or chloroform, and are characterized by a therapeutic action on blood parasites.

15. The compounds of the general formula:

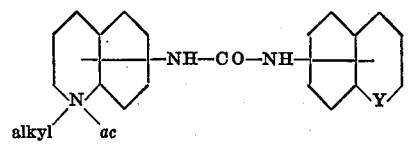

wherein $ac$ stands for the radical of a mineral acid selected from the group consisting of hydrohalic and sulfuric acids and Y stands for a trivalent nitrogen atom which compounds are whitish to yellowish crystalline products, soluble in water and mono- or polyvalent liquid alcohols, slightly soluble in benzene, nitrobenzene, ether or chloroform, and are characterized by a therapeutic action on blood parasites.

16. The compounds of the general formula:

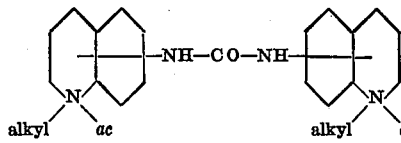

wherein $ac$ stands for the radical of a mineral acid selected from the group consisting of hydrohalic and sulfuric acids, which compounds are whitish to yellowish products, soluble in water and mono- or polyvalent liquid alcohols, slightly soluble in benzene, nitrobenzene, ether or chloroform, and are characterized by a therapeutic action on blood parasites.

17. The compounds of the formula:

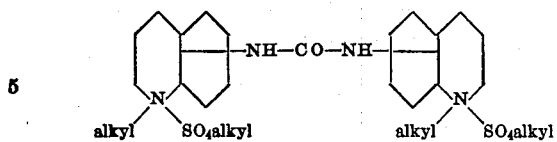

which compounds are whitish to yellowish products, soluble in water and mono- or polyvalent liquid alcohols, slightly soluble in benzene, nitrobenzene, ether or chloroform, and are characterized by a therapeutic action on blood parasites.

18. The compounds of the formula:

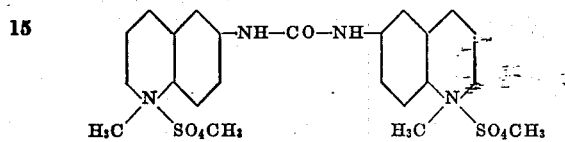

which compound forms water-soluble, light yellow crystals, melting at 235 to 237° C. while decomposing.

19. The compound of the formula:

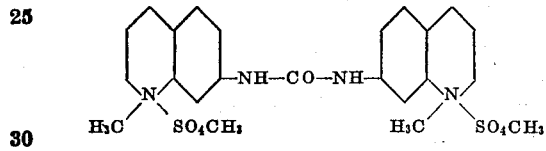

which compound forms water-soluble crystals, melting at 217° C. while decomposing.

20. The compounds of the formula:

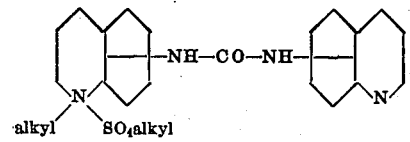

which products are whitish to yellowish crystalline products, soluble in water and mono- or polyvalent liquid alcohols, slightly soluble in benzene, nitrobenzene, ether or chloroform, and are characterized by a therapeutic action on blood parasites.

21. The compound of the formula:

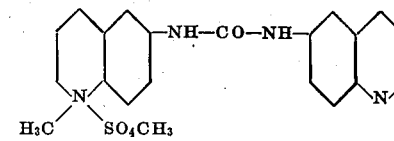

which compound forms water-soluble crystals melting at 168° C.

FRITZ SCHÖNHÖFER.
HANS HENECKA.